(12) United States Patent
Li et al.

(10) Patent No.: US 11,106,932 B2
(45) Date of Patent: Aug. 31, 2021

(54) METHOD FOR EXTRACTING ROBOT PROCESSING BOUNDARY OF THIN-WALLED PART WITH SMALL CURVATURE BASED ON THREE-DIMENSIONAL POINT CLOUD

(71) Applicant: HUAZHONG UNIVERSITY OF SCIENCE AND TECHNOLOGY, Hubei (CN)

(72) Inventors: Wenlong Li, Hubei (CN); Cheng Jiang, Hubei (CN); Gang Wang, Hubei (CN); Zelong Peng, Hubei (CN); Han Ding, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 17/059,474

(22) PCT Filed: Jun. 13, 2020

(86) PCT No.: PCT/CN2020/095987
§ 371 (c)(1),
(2) Date: Nov. 30, 2020

(87) PCT Pub. No.: WO2021/000719
PCT Pub. Date: Jan. 7, 2021

(65) Prior Publication Data
US 2021/0174121 A1  Jun. 10, 2021

(30) Foreign Application Priority Data

Jun. 30, 2019 (CN) .......................... 201910581642.8

(51) Int. Cl.
*G06K 9/00* (2006.01)
*G06K 9/46* (2006.01)
*G06K 9/62* (2006.01)

(52) U.S. Cl.
CPC ....... *G06K 9/4604* (2013.01); *G06K 9/00664* (2013.01); *G06K 9/6202* (2013.01)

(58) Field of Classification Search
CPC . G06K 9/4604; G06K 9/00664; G06K 9/6202
(Continued)

(56) References Cited

U.S. PATENT DOCUMENTS 9,858,640 B1 *  1/2018  Earl .......................... G06T 7/33
10,099,372 B2 * 10/2018  Vu ........................... G01S 17/89
(Continued)

FOREIGN PATENT DOCUMENTS

| CN | 109191484 | 1/2019 |
| CN | 109872397 | 6/2019 |
| CN | 110322464 | 10/2019 |

OTHER PUBLICATIONS

"International Search Report (Form PCT/ISA/210) of PCT/CN2020/095987," dated Sep. 16, 2020, pp. 1-5.
(Continued)

*Primary Examiner* — Jonathan S Lee
(74) *Attorney, Agent, or Firm* — JCIP Global Inc.

(57) ABSTRACT

The disclosure discloses a method for extracting a boundary of a thin-walled part with small curvature based on three-dimensional point cloud. The method includes: collecting point cloud data of a part to reduce density of the point cloud data, performing Euclidean cluster to divide into point cloud pieces, obtaining triangular mesh surfaces for each point cloud triangulation; extracting a boundary vertex of each triangular mesh surface to obtain a contour thereof, selecting a contour of the part among all contours; searching with each (Continued)

point on the contour as a center to form a three-dimensional boundary point cloud band; projecting the three-dimensional boundary point cloud band to a plane, orderly extracting two-dimensional boundary points within the plane, and arranging corresponding points in the three-dimensional boundary point cloud band according to an order of ordered boundary points within the plane to obtain ordered boundary points in the three-dimensional boundary point cloud band.

12 Claims, 5 Drawing Sheets

(58) Field of Classification Search
USPC .......................................................... 382/153
See application file for complete search history.

(56) References Cited

U.S. PATENT DOCUMENTS

| | | | |
|---|---|---|---|
| 10,198,872 B2* | 2/2019 | Lurie | G06T 19/20 |
| 10,319,146 B2* | 6/2019 | Steinbach | G06T 3/00 |
| 10,579,875 B2* | 3/2020 | Dal Mutto | G06T 7/285 |
| 10,607,373 B2* | 3/2020 | Mammou | G06T 9/00 |
| 10,691,979 B2* | 6/2020 | Dal Mutto | G06T 7/90 |
| 10,776,639 B2* | 9/2020 | Steinberg | G01S 7/4873 |
| 10,776,651 B2* | 9/2020 | Yuvaraj | G06T 7/73 |
| 10,867,430 B2* | 12/2020 | Lucas | G06T 19/20 |
| 10,916,035 B1* | 2/2021 | Kroeger | G06K 9/00791 |
| 10,932,890 B1* | 3/2021 | Sant | G16H 40/67 |
| 11,030,801 B2* | 6/2021 | Huber | G06K 9/00201 |

OTHER PUBLICATIONS

Zeng Qihong, et al., "Building Roof Boundary Extraction from LiDAR Point Cloud," Geomatics and Information Science of Wuhan University, vol. 34, Apr. 2009, pp. 383-386.

* cited by examiner

METHOD FOR EXTRACTING ROBOT PROCESSING BOUNDARY OF THIN-WALLED PART WITH SMALL CURVATURE BASED ON THREE-DIMENSIONAL POINT CLOUD

CROSS-REFERENCE TO RELATED APPLICATION

This application is a 371 of international application of PCT application serial no. PCT/CN2020/095987, filed on Jun. 13, 2020, which claims the priority benefit of China application no. 201910581642.8, filed on Jun. 30, 2019. The entirety of each of the above mentioned patent applications is hereby incorporated by reference herein and made a part of this specification.

BACKGROUND

Technical Field

The disclosure relates to the field of robot vision measurement, and more specifically relates to a method for extracting a boundary of a thin-walled part with small curvature based on three-dimensional point cloud.

Description of Related Art

The thin-walled part with low curvature is used as a basic part in special fields, such as the aircraft wing and fuselage skin in the aviation field, and the rocket skin in the aerospace field. Automatic, high-efficiency, and high-precision extraction of the boundary of the thin-walled part with low curvature is the prerequisite for automatic processing, detection, and error evaluation of the thin-walled parts. Although there are several mature general-purpose point cloud processing software for extracting the boundary of the point cloud, the following issues arise during actual application to production.

1) When processing noise data, manual intervention is required for manual deletion. 2) Software operators are required to have relatively high computer knowledge, software operation knowledge, and relevant knowledge for computer graphics, so the qualification for operators is high. 3) For the same point cloud piece, different people may obtain different boundary curves when performing software operations. 4) The extraction from the original point cloud data to the target boundary curve is all performed on the point cloud of the original density, which requires high processor hardware performance and long processing time.

SUMMARY

In view of the defects or improvement requirements of the prior art, the disclosure provides a method for extracting a boundary of a thin-walled part with small curvature based on three-dimensional point cloud. Through extracting the boundary by adopting triangular patch, and then selecting the contour of a part to be processed in the boundary by adopting triangular patch, the noise in the original point cloud data is removed. Then, through orderly extracting boundary points within a plane, and finally mapping ordered boundary points within the plane into a three-dimensional boundary point cloud band, the ordered boundary points in the three-dimensional boundary point cloud band are obtained. The boundary contour of the part to be processed obtained by such method has high accuracy and small error, which improves the collection efficiency of the boundary of the thin-walled part with small curvature.

To achieve the above objective, according to the disclosure, a method for extracting a boundary of a thin-walled part with small curvature based on three-dimensional point cloud is provided. The method includes the following steps.

(a) Point cloud data of a part to be processed is obtained.

(a1) The point cloud data of the part to be processed is collected. Initial point cloud data, including noise, of the part to be processed is obtained. The initial point cloud data is preprocessed to reduce density of the point cloud data, so as to obtain low-density point cloud data. Euclidean cluster is performed on points in the low-density point cloud data, so that the low-density point cloud data is divided into multiple point cloud pieces. Points in each of the point cloud pieces are connected to form a triangle to implement triangulation of each point cloud piece, so as to obtain multiple triangular mesh surfaces.

(a2) A boundary vertex of each of the triangular mesh surfaces is extracted to obtain contours of multiple triangular mesh surfaces, so as to obtain contours of all triangular mesh surfaces. A selection criteria for the contour of the part to be processed is set. The contour of the part to be processed is selected among the contours of all the triangular mesh surfaces. Points included in the contour are the point cloud data corresponding to the part to be processed.

(b) An ordered boundary is extracted.

(b1) Each point on the contour of the part to be processed is used as a seed point. Search is performed according to a preset radius with each seed point as the center to obtain a point cloud block of each seed point. The point cloud blocks of all seed points form a three-dimensional boundary point cloud band.

(b2) All points in the three-dimensional boundary point cloud band are fitted to form a plane. Then, all the points on the three-dimensional boundary point cloud band are projected into the plane to obtain a plane boundary point cloud band. Points in the plane boundary point cloud band are extracted according to set rules to obtain ordered boundary points within the plane. Corresponding points in the three-dimensional boundary point cloud band are arranged according to an order of the ordered boundary points within the plane to obtain ordered boundary points in the three-dimensional boundary point cloud band. After the ordered boundary points in the three-dimensional boundary point cloud band are sequentially connected, the boundary contour of the part to be processed is obtained, that is, the orderly extraction of the boundary of the part to be processed of the three-dimensional point cloud is implemented.

Further preferably, in step (a1), the preprocessing adopts equidistant down-sampling or curvature adaptive sampling.

Further preferably, in step (a2), the extraction of the boundary vertex of each of the triangular mesh surfaces is preferably performed according to the following manner. For each triangular mesh surface, a number of appearances of each edge in each triangular mesh among all triangular meshes is calculated. Two vertices corresponding to the edge that only appears in one triangular mesh are boundary vertices. The two vertices are extracted to implement the extraction of the boundary vertex of the triangular mesh surface.

Further preferably, in step (a2), the setting of the selection criteria for the contour of the part to be processed is preferably performed according to the following manner. The contours of all the triangular mesh surfaces are compared with the theoretical contour of the part to be processed. A contour of a triangular mesh surface closest to the theoretical contour of the part to be processed is used as the contour of the part to be processed. Alternatively, a number of points included in the contours of all the triangular mesh surfaces are compared. A contour of a triangular mesh surface with the most number of points is used as the contour of the part to be processed.

Further preferably, in step (b2), the extraction of the points in the plane boundary point cloud band according to the set rules to obtain the ordered boundary points within the plane is preferably performed according to the following steps.

(b21) A coordinate system is established in the plane boundary point cloud band. An initial point $p_0$ is selected. k adjacent points adjacent to the initial point are obtained. An included angle between a vector formed by connecting the initial point with each of the adjacent points and a positive X-axis direction is calculated to obtain k included angles. The adjacent point on the vector with the largest included angle is a second ordered point $p_1$. The vector with the largest included angle $\vec{n}_1$. A vector set with the largest included angle is set. The $\vec{n}_1$ is added to the vector set.

(b22) For any ordered point $p_i$, the manner of obtaining a next ordered point is as follows.

In step S1, for an i-th ordered point $p_i$ and a corresponding vector $\vec{n}_i$ in the vector set, k adjacent points adjacent to the ordered point $p_i$ are obtained.

In step S2, an included angle between a vector formed by connecting the ordered point $p_i$ with each of the adjacent points and the vector $\vec{n}_1$ is calculated to obtain k included angles. The adjacent point on the vector with the largest included angle is an i+1-th ordered point $p_{i+1}$. The vector with the largest included angle is $\vec{n}_{i+1}$. The vector $\vec{n}_{i+1}$ is added to the vector set.

In step S3, whether the vector $\vec{n}_{i+1}$ intersects any vector in the vector set is judged.

When there is an intersection, the ordered point $p_{i+1}$ is deleted from the k adjacent points, and step S2 is returned for remaining k−1 points.

When there is no intersection, whether the ordered point $p_{i+1}$ and the initial point $p_0$ are the same point is judged.

When the ordered point $p_{i+1}$ and the initial point $p_0$ are not the same point, i=i+1 and step S1 is returned.

When the ordered point $p_{i+1}$ and the initial point $p_0$ are the same point, the process ends, and required ordered boundary points are obtained so far, where k is a positive integer not less than 3, and i is a positive integer greater than 1.

Further preferably, in steps (b21) and S1, a manner of k nearest neighbor search is adopted preferably to obtain the k adjacent points adjacent to the initial point and obtain the k adjacent points adjacent to the ordered point $p_i$.

Further preferably, a point with the smallest average X-axis and Y-axis coordinate values in the plane boundary point cloud band is adopted as the initial point $p_0$ preferably.

Further preferably, in step (a1), the connection of the points in each of the point cloud pieces to form the triangle is preferably performed by adopting a greedy projection triangulation algorithm.

Further preferably, in step (b2), the fitting of all the points in the three-dimensional boundary point cloud band to form the plane is preferably performed by adopting the least squares method.

In general, compared with the prior art, the above technical solutions conceived by the disclosure can achieve the following beneficial effects.

1. The disclosure obtains the point cloud piece through performing Euclidean cluster on the point cloud data. After triangulating the point cloud piece, the contour of the point cloud piece is extracted and the contour of the part to be processed is selected. On the one hand, the denoising processing of the original point cloud data is implemented. On the other hand, the initial extraction of the contour of the part to be processed is implemented.

2. The method provided by the disclosure performs the crude extraction of the contour of the point cloud piece, then performs the orderly extraction of the point cloud boundary within the plane, and finally maps the same into the three-dimensional boundary point cloud band, so as to obtain the ordered boundary in the three-dimensional boundary point cloud band. The method first crudely extracts and then finely extracts, which adapts to the high-efficiency and high-precision extraction of boundaries of large-scale scattered point clouds.

3. The disclosure implements the orderly extraction of the boundary points on the plane boundary point cloud band through adopting the boundary point search based k neighboring features, which overcomes the inability of conventional point cloud boundary extraction algorithms to achieve the ordering of the boundary point set, and solves the defect of the inability of conventional boundary point set ordering algorithms to adapt to the non-convex polygon point set.

4. The disclosure projects the curved surface point cloud in three-dimensional space onto the main plane of the point cloud, which targets the characteristics of the thin-walled part with low curvature. For parts with large curvature, when three-dimensional curved surface point clouds thereof are projected to a plane, the overlap of point clouds may occur. Such issue is not present for parts with small curvature. Therefore, the method provided by the disclosure is more suitable for the parts with small curvature. In addition, the method uses the cursor association of the point cloud through dimensionality reduction processing to efficiently and stably implement the extraction of the boundary of a spatial curved surface with low curvature.

DETAILED DESCRIPTION OF DISCLOSED EMBODIMENTS

For the objectives, technical solutions, and advantages of the disclosure to be clearer, the disclosure is further described in detail below with reference to the accompanying drawings and embodiments. It should be understood that the specific embodiments described here are only used to explain the disclosure, but not to limit the disclosure. In addition, the technical features involved in the various embodiments of the disclosure described below may be combined with each other as long as there is no conflict therebetween.

Figure 1:
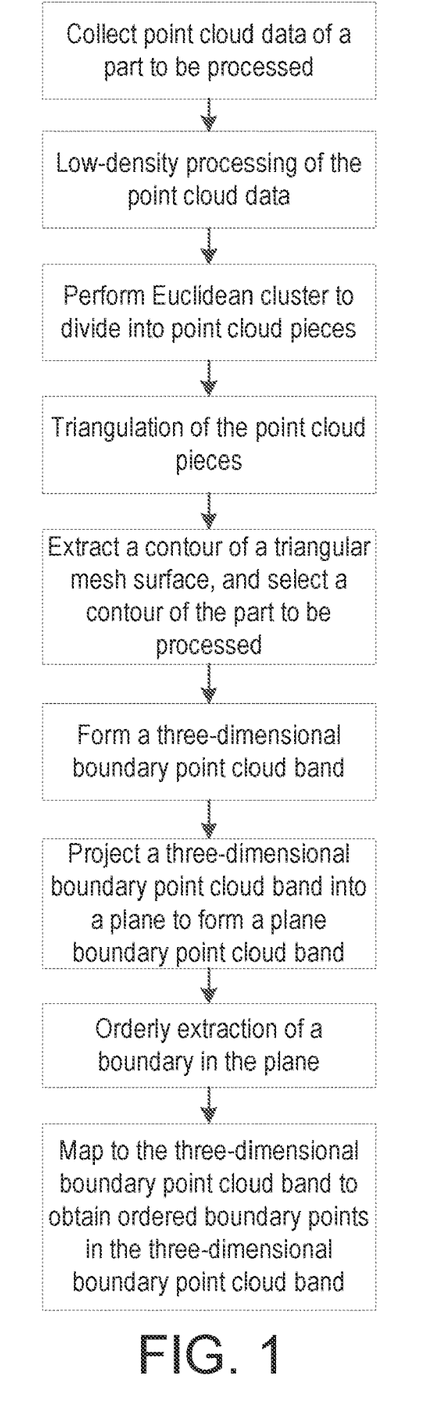
FIG. 1 shows a method for extracting a boundary of a thin-walled part with small curvature based on three-dimensional point cloud according to a preferred embodiment of the disclosure.

As shown in FIG. 1, a method for extracting a boundary of a thin-walled part with small curvature based on three-dimensional point cloud includes the following steps.

(a) Point cloud data of a part to be processed is obtained.

(a1) The point cloud data of the part to be processed is collected. Initial point cloud data, including noise, of the part to be processed is obtained. The initial point cloud data is preprocessed to reduce density of the point cloud data, so as to obtain low-density point cloud data. Euclidean cluster is performed on points in the low-density point cloud data, so that the low-density point cloud data is divided into multiple point cloud pieces. Points in each of the point cloud pieces are connected to form a triangle to implement triangulation of each point cloud piece, so as to obtain multiple triangular mesh surfaces.

Figure 2A:
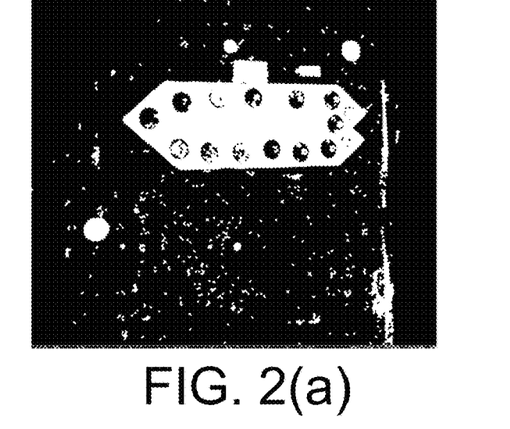
FIG. 2(a) shows collected three-dimensional point cloud data of a part to be processed according to a preferred embodiment of the disclosure.
Figure 2B:
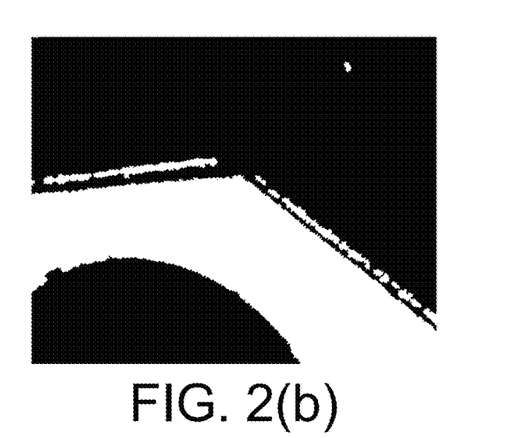
FIG. 2(b) is a partial enlarged view of a boundary in the collected three-dimensional point cloud data of the part to be processed according to a preferred embodiment of the disclosure.

In the embodiment, as shown in FIG. 2(a), it can be seen that in addition to the part, there is a lot of messy background point cloud data, i.e. noise, in the collected point cloud data of the part to be processed. FIG. 2(b) is a partial enlarged view of the boundary of the part in FIG. 2(a). It can be seen from the drawing that there are also a lot of messy points on the boundary of the part to be processed, instead of a clear boundary.

(a2) A boundary vertex of each of the triangular mesh surfaces is extracted to obtain contours of multiple triangular mesh surfaces, so as to obtain contours of all triangular mesh surfaces. A selection criteria for the contour of the part to be processed is set. The contour of the part to be processed is selected among the contours of all the triangular mesh surfaces. Points included in the contour are the point cloud data corresponding to the part to be processed.

Figure 3:
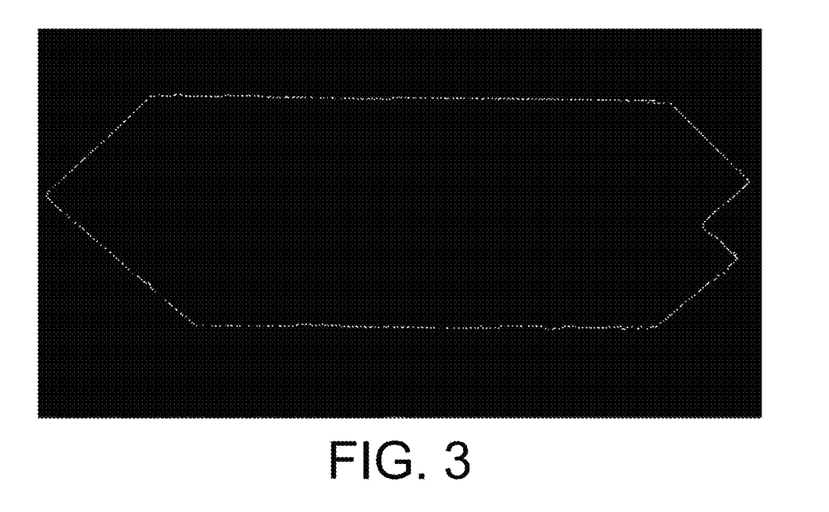
FIG. 3 shows extracted three-dimensional point cloud data of the part to be processed after triangular meshing according to a preferred embodiment of the disclosure.

In the embodiment, as shown in FIG. 3, it can be seen from the contour of the part extracted after triangular meshing the point cloud data in FIG. 2(a) according to the method provided by the disclosure that the contour in the drawing is still not very clear and complete, and the features are also not very accurate.

(b) An ordered boundary is extracted.

(b1) Each point on the contour of the part to be processed is used as a seed point. Search is performed according to a preset radius with each seed point as the center to obtain a point cloud block of each seed point. The point cloud blocks of all seed points form a three-dimensional boundary point cloud band.

Figure 7:
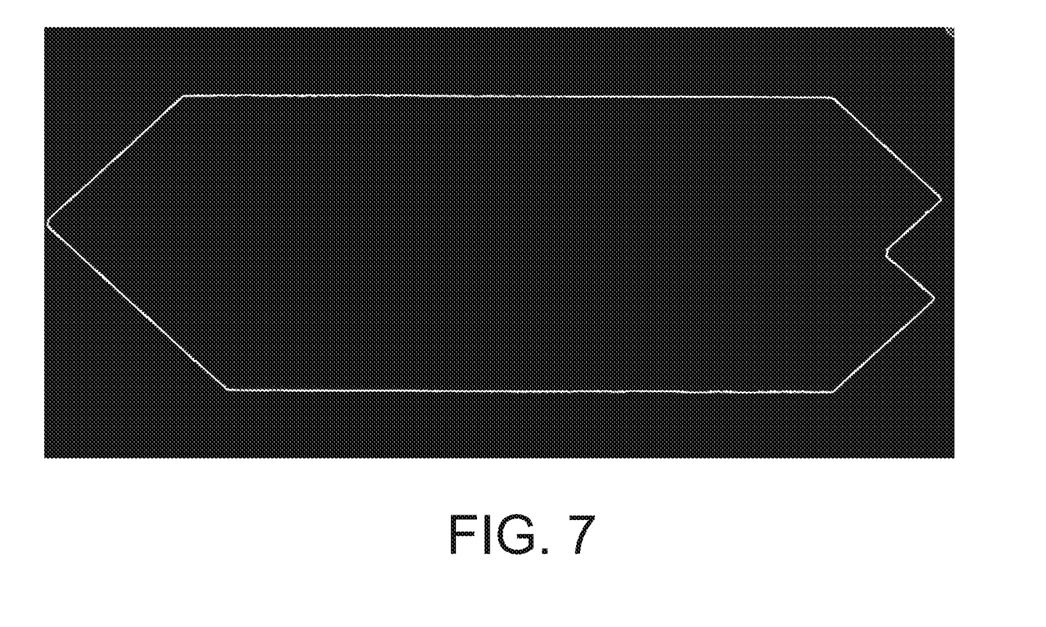
FIG. 7 shows a contour of a part to be processed obtained by the method provided by the disclosure according to a preferred embodiment of the disclosure.

(b2) All points in the three-dimensional boundary point cloud band are fitted to form a plane. Then, all the points on the three-dimensional boundary point cloud band are projected into the plane to obtain a plane boundary point cloud band. Points in the plane boundary point cloud band are extracted according to set rules to obtain ordered boundary points within the plane. Corresponding points in the three-dimensional boundary point cloud band are arranged according to an order of the ordered boundary points within the plane to obtain ordered boundary points in the three-dimensional boundary point cloud band. After the ordered boundary points in the three-dimensional boundary point cloud band are sequentially connected, the boundary contour of the part to be processed is obtained, that is, the orderly extraction of the boundary of the part to be processed of the three-dimensional point cloud is implemented. FIG. 7 shows the boundary of the part finally obtained according to the method provided by the disclosure, which is very close to the actual contour of the part and has high accuracy.

Further, in step (a1), the preprocessing adopts equidistant down-sampling or curvature adaptive sampling.

Further, in step (a2), the extraction of the boundary vertex of each of the triangular mesh surfaces is preferably performed according to the following manner. For each triangular mesh surface, a number of appearances of each edge in each triangular mesh among all triangular meshes is calculated. Two vertices corresponding to the edge that only appears in one triangular mesh are boundary vertices. The two vertices are extracted to implement the extraction of the boundary vertex of the triangular mesh surface.

Figure 4:
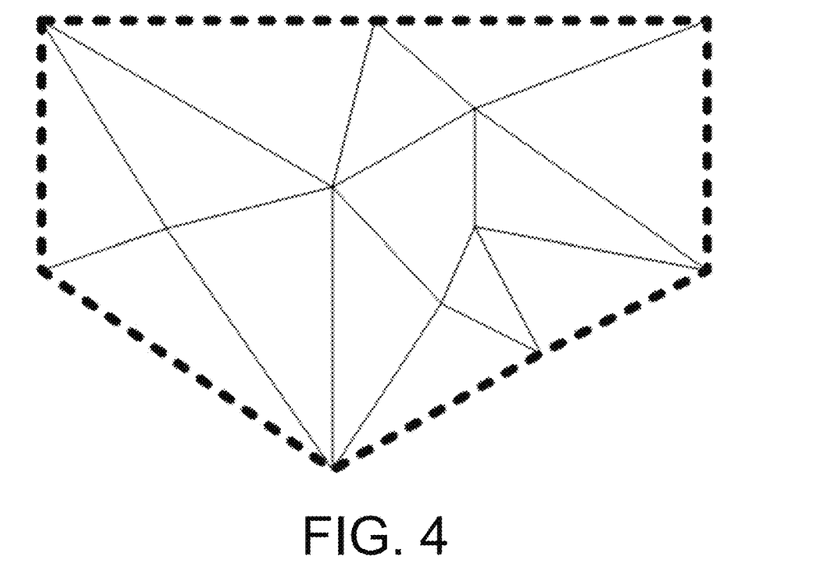
FIG. 4 is a schematic diagram of a principle for extracting a boundary vertex in a triangular mesh according to a preferred embodiment of the disclosure.

FIG. 4 shows the main principle for extracting the boundary of a point cloud object based on triangular patch. That is, the edge at the boundary of a triangular patch is unique to the triangular patch, and the edge at a non-boundary of the triangular patch is shared by two triangular patches, specifically as follows.

(1) Each edge in each triangular patch is defined as a directed edge, which is constituted by a small vertex as a starting point $pt_i(x_i, y_i, z_i)$ and a large vertex as an ending point $pt_j(x_j, y_j, z_j)$, of global cursors (where i and j are the global cursors of the point, and i<j).

(2) All directed edges in the point cloud object based on triangular patch are traversed, and the directed edges with the same starting point are clustered.

(3) A set is constituted by the directed edges with the same starting point. All edges in the set are traversed. A number of appearances of each edge is counted. Vertices $pt_{consti}$ and $pt_{ti}$ corresponding to the directed edge that appears only once are added to the end of an disordered boundary point queue QueueEdgePt. Global cursors consti and ti corresponding to the vertices $pt_{consti}$ and $pt_{ti}$ are added to the end of a boundary point cursor queue QueueEdgeIndex.

(4) Step (2) and step (3) are performed for all directed edge sets with the same starting point. The disordered boundary point queue QueueEdgePt the triangulated point cloud object and the boundary point cursor queue QueueEdgeIndex corresponding to the disordered boundary point are obtained. Through deleting repeated points in the disordered boundary point queue QueueEdgePt, a boundary vertex set of the triangulated point cloud object is obtained.

Further, in step (a2), the setting of the selection criteria for the contour of the part to be processed is preferably performed according to the following manner. The contours of all the triangular mesh surfaces are compared with the theoretical contour of the part to be processed. A contour of a triangular mesh surface closest to the theoretical contour of the part to be processed is used as the contour of the part to be processed. Alternatively, a number of points included in the contours of all the triangular mesh surfaces are compared. A contour of a triangular mesh surface with the most number of points is used as the contour of the part to be processed.

Further, in step (b2), the extraction of the points in the plane boundary point cloud band according to the set rules to obtain the ordered boundary points within the plane is preferably performed according to the following steps.

(b21) A coordinate system is established in the plane boundary point cloud band. An initial point $p_0$ is selected. k adjacent points adjacent to the initial point are obtained. An included angle between a vector formed by connecting the initial point with each of the adjacent points and a positive X-axis direction is calculated to obtain k included angles. The adjacent point on the vector with the largest included angle is a second ordered point $p_1$. The vector with the largest included angle is $\vec{n}_1$. A vector set with the largest included angle is set. The $\vec{n}_1$ is added to the vector set.

Figure 5A:
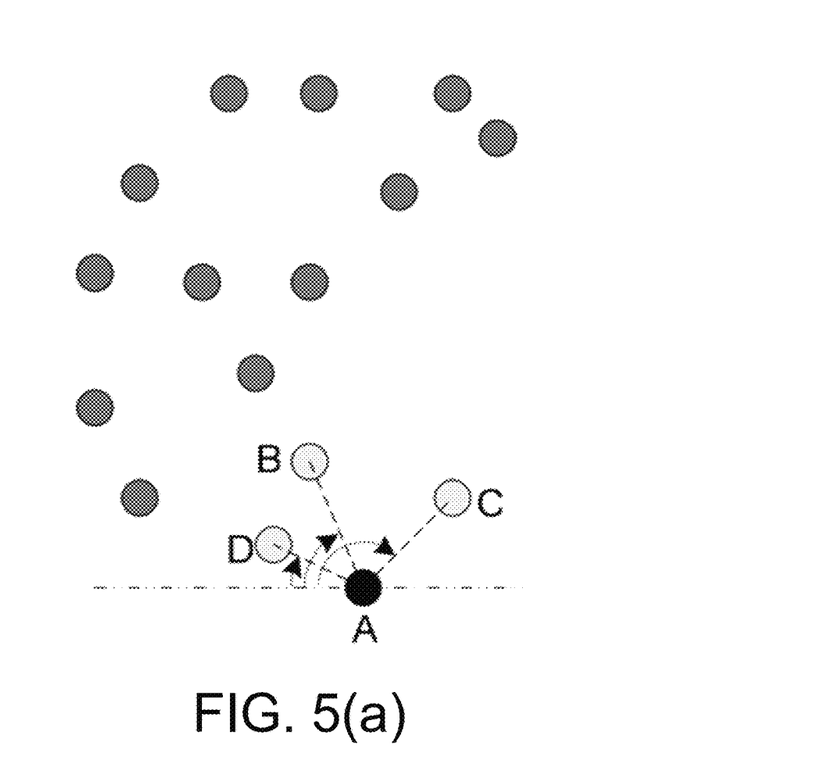
FIG. 5(a) is a schematic diagram for obtaining a second ordered point according to an initial point when extracting boundary points in a plane according to a preferred embodiment of the disclosure.
Figure 5B:
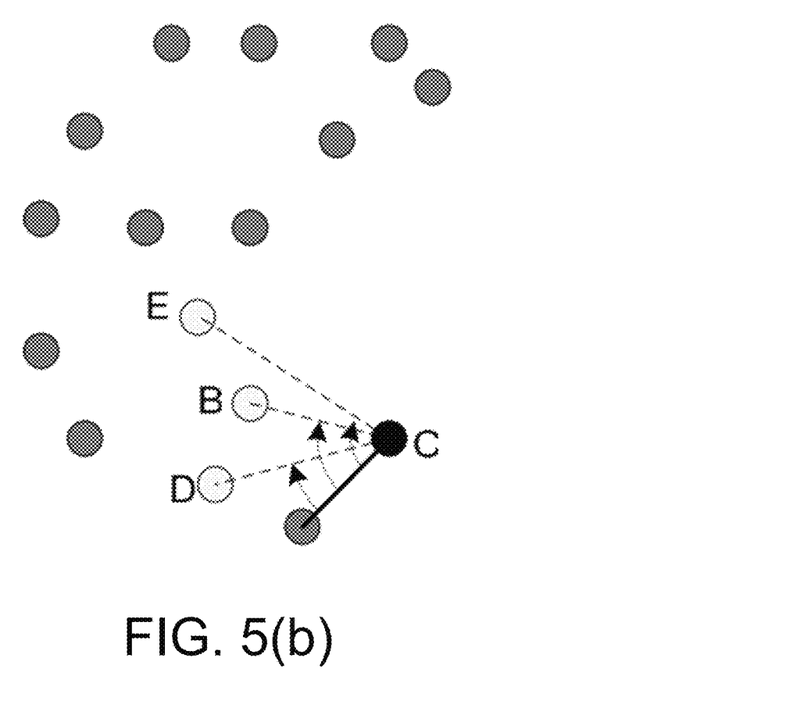
FIG. 5(b) is a schematic diagram for searching a next ordered point through any point when extracting a plane boundary according to a preferred embodiment of the disclosure.

(b22) As shown in FIG. 5(b), a point C in the drawing is any ordered point $p_i$. For any ordered point $p_i$, the manner of obtaining a next ordered point is as follows.

In step S1, for an i-th ordered point $p_i$ and a corresponding vector $\vec{n}_i$ in the vector set, k adjacent points adjacent to the ordered point $p_i$ are obtained. As shown in FIG. 5(b), B, D, and E are the adjacent points of the ordered point $p_i$.

In step S2, an included angle between a vector formed by connecting the ordered point $p_i$ with each of the adjacent points and the vector $\vec{n}_1$ is calculated to obtain k included angles. The adjacent point on the vector with the largest included angle is an i+1-th ordered point $p_{i+1}$. The vector with the largest included angle is $\vec{n}_{i+1}$. The vector $\vec{n}_{i+1}$ is added to the vector set.

In step S3, whether the vector $\vec{n}_{i+1}$ intersects any vector in the vector set is judged.

When there is an intersection, the ordered point $p_{i+1}$ is deleted from the k adjacent points, and r step S2 is returned for remaining k-1 points.

When there is no intersection, whether the ordered point $p_{i+1}$ and the initial point $p_0$ are the same point is judged.

When the ordered point $p_{i+1}$ and the initial point $p_0$ are not the same point, i=i+1 and step S1 is returned.

Figure 5C:
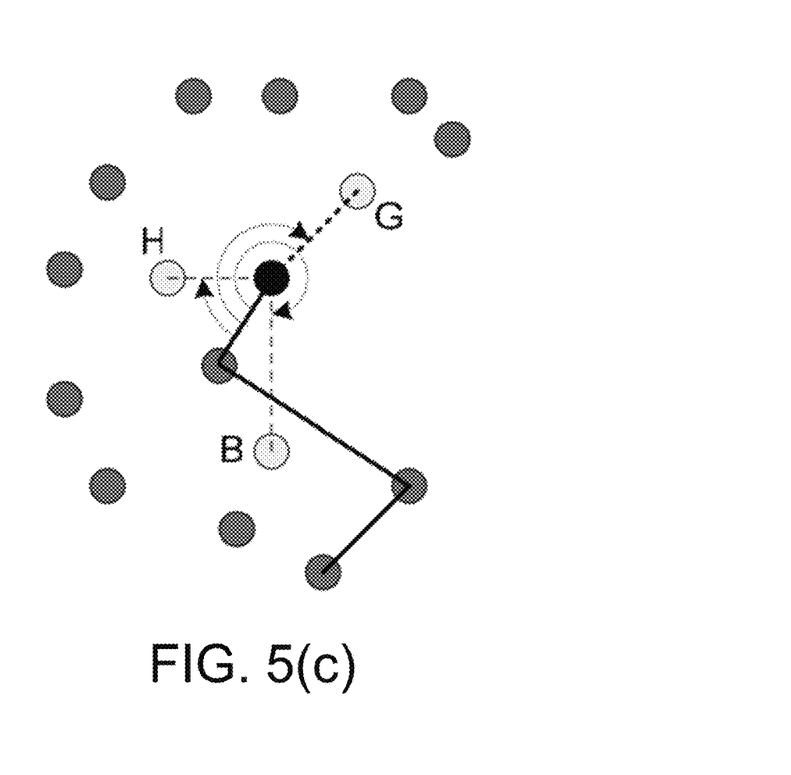
FIG. 5(c) is a schematic diagram for obtaining boundary ordered points within the plane according to a preferred embodiment of the disclosure.
Figure 6:
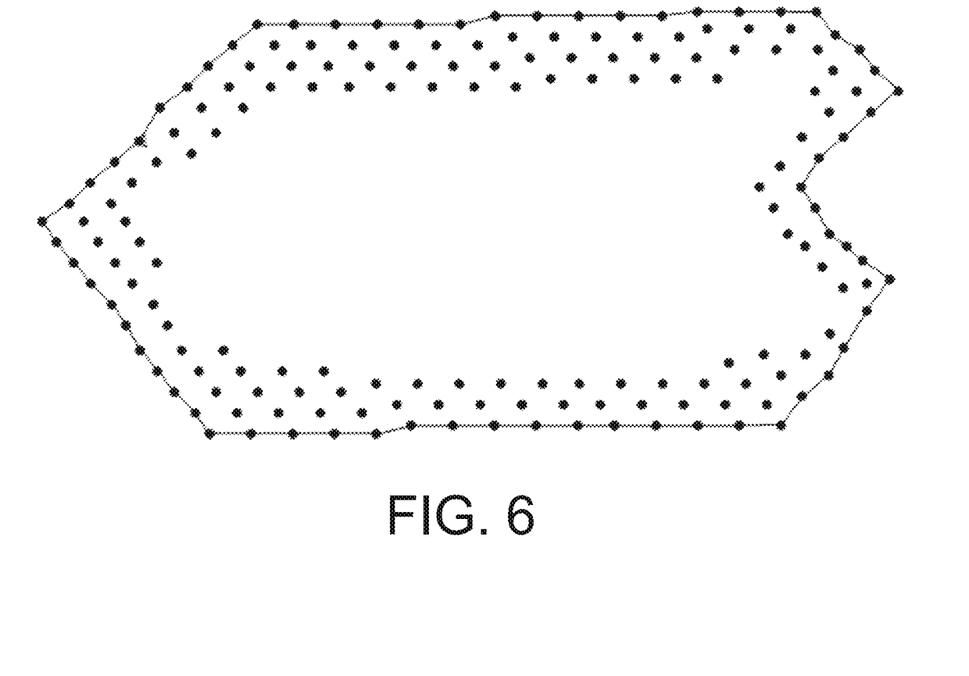
FIG. 6 shows extracted ordered boundary points in a plane boundary point cloud band according to a preferred embodiment of the disclosure.

When the ordered point $p_{i+1}$ and the initial point $p_0$ are the same point, the process ends, and required ordered boundary points are obtained so far, where k is a positive integer not less than 3, and i is a positive integer greater than 1. As shown in FIG. 5(c), the ordered boundary points are gradually found. FIG. 6 is the required ordered boundary points obtained within the plane.

Further, in steps (b21) and S1, a manner of k nearest neighbor search is adopted preferably to obtain the k adjacent points adjacent to the initial point and obtain the k adjacent points adjacent to the ordered point $p_i$.

Further, a point corresponding to the smallest X-axis and Y-axis coordinate values in the plane boundary point cloud band is adopted as the initial point $p_0$ preferably. As shown in FIG. 5(a), the initial point in the drawing is a point A, and points B, C, and D are adjacent points thereof.

Further, in step (b2), the fitting of all points in the three-dimensional boundary point cloud band to form a plane is preferably performed by adopting the least squares method. Specifically, the general expression of the plane equation is:

$$Ax + By + Cz + D = 0 (C \neq 0)$$

$$z = -\frac{A}{C}x - \frac{B}{C}y - \frac{D}{C}$$

Let $$a_0 = -\frac{A}{C}, a_1 = -\frac{B}{C}, a_2 = -\frac{D}{C},$$

then, $z = a_0 x + a_1 y + a_2$.

The plane equation fitting for a series of n points (n>=3), $(x_i, y_i, z_i)$, i=0, 1, ..., n-1, there is $$S = \sum_{i=0}^{n-1} (a_0 x_i + a_1 y_i + a_2 - z_i)^2,$$

which is the smallest, and $$\frac{\partial S}{\partial a_k} = 0, k = 0, 1, 2.$$

That is:

$$\begin{cases} \sum 2(a_0 x_i + a_1 y_i + a_2 - z_i) x_i = 0 \\ \sum 2(a_0 x_i + a_1 y_i + a_2 - z_i) y_i = 0 \\ \sum 2(a_0 x_i + a_1 y_i + a_2 - z_i) z_i = 0 \end{cases}$$

There is $$\begin{bmatrix} \sum x_i^2 & \sum x_i y_i & \sum x_i \\ \sum x_i y_i & \sum y_i^2 & \sum y_i \\ \sum x_i & \sum y_i & n \end{bmatrix} \begin{pmatrix} a_0 \\ a_1 \\ a_2 \end{pmatrix} = \begin{pmatrix} \sum x_i z_i \\ \sum y_i z_i \\ \sum z_i \end{pmatrix}.$$

Solving the above linear equations gives: $a_0$, $a_1$, $a_2$.

Therefore, A,B,C are normalized into a unit direction vector to obtain a normal vector [normalA, normalB, normalC] (normalC>0) of the plane.

In the implementation of the disclosure, an area-array scanner is adopted to obtain high-density scattered point cloud data. The point cloud data amount collected at a time may be up to 5 million. In order to ensure the quality of the point cloud collection by the area-array scanner, the reflective surface needs to be pretreated with a contrast agent that meets the requirements of industrial field applications.

The general data amount of spliced point cloud data may be up to 20-30 million levels. In order to speed up the point cloud processing, the equidistant down-sampling is first performed on the point cloud to reduce the point cloud data to below million levels.

Persons skilled in the art may easily understand that the above descriptions are only preferred embodiments of the disclosure and are not intended to limit the disclosure. Any modification, equivalent replacement, improvement, etc. made within the spirit and principle of the disclosure should be included in the protection scope of the disclosure.

What is claimed is:

1. A method for extracting a boundary of a thin-walled part with small curvature based on three-dimensional point cloud, characterized in that the method includes the following steps:
- (a) obtaining point cloud data of a part to be processed, including:
- (a1) collecting the point cloud data of the part to be processed, obtaining initial point cloud data, comprising noise, of the part to be processed, performing an preprocessing for the initial point cloud data to reduce density of the point cloud data to obtain low-density point cloud data, performing Euclidean cluster on points in the low-density point cloud data, so that the low-density point cloud data is divided into a plurality of point cloud pieces, and connecting points in each of the point cloud pieces to form a triangle to implement triangulation of each of the point cloud pieces, so as to obtain a plurality of triangular mesh surfaces; and
- (a2) extracting a boundary vertex of each of the triangular mesh surfaces to obtain contours of the triangular mesh surfaces, so as to obtain contours of all triangular mesh surfaces, setting a selection criteria for a contour of the part to be processed, and selecting the contour of the part to be processed among the contours of all the triangular mesh surfaces, wherein points comprised in the contour are the point cloud data corresponding to the part to be processed; and
- (b) extracting an ordered boundary, including:
- (b1) using each point on the contour of the part to be processed as a seed point, and searching according to a preset radius with each seed point as a center to obtain a point cloud block of each seed point, wherein point cloud blocks of all seed points form a three-dimensional boundary point cloud band; and
- (b2) fitting all points in the three-dimensional boundary point cloud band to form a plane, then projecting all the points on the three-dimensional boundary point cloud band into the plane to obtain a plane boundary point cloud band, extracting points in the plane boundary point cloud band according to set rules to obtain ordered boundary points within the plane, arranging corresponding points in the three-dimensional boundary point cloud band according to an order of the ordered boundary points within the plane to obtain ordered boundary points in a three-dimensional boundary point cloud band, and obtaining a boundary contour of the part to be processed after the ordered boundary points in the three-dimensional boundary point cloud band are sequentially connected, that is, implementing orderly extraction of the boundary of the part to be processed of the three-dimensional point cloud.

2. The method for extracting the boundary of the thin-walled part with small curvature based on the three-dimensional point cloud according to claim 1, characterized in that in step (a1), the preprocessing adopts equidistant downsampling or curvature adaptive sampling.

3. The method for extracting the boundary of the thin-walled part with small curvature based on the three-dimensional point cloud according to claim 2, characterized in that in step (a2), extraction of the boundary vertex of each of the triangular mesh surfaces is performed according to a following manner: calculating a number of appearances of each edge in each triangular mesh among all triangular meshes for each triangular mesh surface, wherein two vertices corresponding to an edge that only appears in one triangular mesh are boundary vertices, and the two vertices are extracted to implement the extraction of the boundary vertex of each of the triangular mesh surfaces.

4. The method for extracting the boundary of the thin-walled part with small curvature based on the three-dimensional point cloud according to claim 2, characterized in that in step (a2), setting of the selection criteria for the contour of the part to be processed is performed according to a following manner: comparing the contours of all the triangular mesh surfaces with the contour of the part to be processed, and using a contour of a triangular mesh surface closest to the contour of the part to be processed as the contour of the part to be processed; or comparing a number of points included in the contours of all the triangular mesh surfaces, and using a contour of a triangular mesh surface with a most number of points as the contour of the part to be processed.

5. The method for extracting the boundary of the thin-walled part with small curvature based on the three-dimensional point cloud according to claim 2, characterized in that in step (b2), extraction of the points in the plane boundary point cloud band according to the set rules to obtain the ordered boundary points within the plane is performed according to following steps:
- (b21) establishing a coordinate system in the plane boundary point cloud band, selecting an initial point $p_0$, obtaining k adjacent points adjacent to the initial point, calculating an included angle between a vector formed by connecting the initial point with each of the adjacent points and a positive X-axis direction to obtain k included angles, wherein an adjacent point on a vector with a largest included angle is a second ordered point $p_1$, the vector with the largest included angle is $\vec{n}_1$, a vector set with the largest included angle is set, and the $\vec{n}_1$ is added to the vector set; and
- (b22) obtaining a next ordered point for any ordered point $p_i$ by:
- step S1 of obtaining the k adjacent points adjacent to the ordered point $p_i$ for an i-th ordered point $p_i$ and a corresponding vector $\vec{n}_1$ in the vector set;
- step S2 of calculating an included angle between a vector formed by connecting the ordered point $p_i$ with each of the adjacent points and the vector $\vec{n}_1$ to obtain the k included angles, wherein an adjacent point on a vector with a largest included angle is an i+1-th ordered point $p_{i+1}$, the vector with the largest included angle is $\vec{n}_{i+1}$, and the vector $\vec{n}_{i+1}$ is added to the vector set; and
- step S3 of judging whether the vector $\vec{n}_{i+1}$ intersects any vector in the vector set, wherein
- when there is an intersection, the ordered point $p_{i+1}$ is deleted from the k adjacent points, and step S2 is returned for remaining k−1 points; and
- when there is no intersection, whether the ordered point $p_{i+1}$ and the initial point $p_0$ are a same point is judged, wherein
- when the ordered point $p_{i+1}$ and the initial point $p_0$, are not the same point, i=i+1 and step S1 is returned; and
- when the ordered point $p_{1+1}$ and the initial point $p_0$ are the same point, current process ends, and required ordered boundary points are obtained so far, where k is a positive integer not less than 3, and i is a positive integer greater than 1.

6. The method for extracting the boundary of the thin-walled part with small curvature based on the three-dimensional point cloud according to claim 1, characterized in that in step (a2), extraction of the boundary vertex of each of the triangular mesh surfaces is performed according to a following manner: calculating a number of appearances of each edge in each triangular mesh among all triangular meshes for each triangular mesh surface, wherein two vertices corresponding to an edge that only appears in one triangular mesh are boundary vertices, and the two vertices are extracted to implement the extraction of the boundary vertex of each of the triangular mesh surfaces.

7. The method for extracting the boundary of the thin-walled part with small curvature based on the three-dimensional point cloud according to claim 1, characterized in that in step (a2), setting of the selection criteria for the contour of the part to be processed is preferably performed according to a following manner: comparing the contours of all the triangular mesh surfaces with the theoretical contour of the part to be processed, and using a contour of a triangular mesh surface closest to the theoretical contour of the part to be processed as the contour of the part to be processed; or comparing a number of points included in the contours of all the triangular mesh surfaces, and using a contour of a triangular mesh surface with a most number of points as the contour of the part to be processed.

8. The method for extracting the boundary of the thin-walled part with small curvature based on the three-dimensional point cloud according to claim 1, characterized in that in step (b2), extraction of the points in the plane boundary point cloud band according to the set rules to obtain the ordered boundary points within the plane is performed according to following steps:
(b21) establishing a coordinate system in the plane boundary point cloud band, selecting an initial point $p_0$, obtaining k adjacent points adjacent to the initial point, calculating an included angle between a vector formed by connecting the initial point with each of the adjacent points and a positive X-axis direction to obtain k included angles, wherein an adjacent point on a vector with a largest included angle is a second ordered point $p_1$, the vector with the largest included angle is $\vec{n}_1$, a vector set with the largest included angle is set, and the $\vec{n}_1$ is added to the vector set; and
(b22) obtaining a next ordered point for any ordered point $p_i$ by:
step S1 of obtaining the k adjacent points adjacent to the ordered point $p_i$ for an i-th ordered point $p_i$ and a corresponding vector $\vec{n}_1$ in the vector set;
step S2 of calculating an included angle between a vector formed by connecting the ordered point $p_i$ with each of the adjacent points and the vector $\vec{n}_1$ to obtain the k included angles, wherein an adjacent point on a vector with a largest included angle is an i+1-th ordered point $p_{i+1}$, the vector with the largest included angle is $\vec{n}_{i+1}$, and the vector $\vec{n}_{i+1}$ is added to the vector set; and
step S3 of judging whether the vector $\vec{n}_{i+1}$ intersects any vector in the vector set, wherein
when there is an intersection, the ordered point $p_{i+1}$ is deleted from the k adjacent points, and step S2 is returned for remaining k−1 points; and
when there is no intersection, whether the ordered point $p_{i+1}$ and the initial point $p_0$ are a same point is judged, wherein
when the ordered point $p_{i+1}$ and the initial point $p_0$ are not the same point, i=i+1 and step S1 is returned; and
when the ordered point $p_{i+1}$ and the initial point $p_0$, are the same point, current process ends, and required ordered boundary points are obtained so far, where k is a positive integer not less than 3, and i is a positive integer greater than 1.

9. The method for extracting the boundary of the thin-walled part with small curvature based on the three-dimensional point cloud according to claim 8, characterized in that in steps (b21) and S1, a manner of k nearest neighbor search is adopted to obtain the k adjacent points adjacent to the initial point and obtain the k adjacent points adjacent to the ordered point $p_i$.

10. The method for extracting the boundary of the thin-walled part with small curvature based on the three-dimensional point cloud according to claim 8, characterized in that a point with a smallest average X-axis and Y-axis coordinate values in the plane boundary point cloud band is adopted as the initial point $p_0$.

11. The method for extracting the boundary of the thin-walled part with small curvature based on the three-dimensional point cloud according to claim 1, characterized in that in step (a1), connection of the points in each of the point cloud pieces to form the triangle is performed by adopting a greedy projection triangulation algorithm.

12. The method for extracting the boundary of the thin-walled part with small curvature based on the three-dimensional point cloud according to claim 1, characterized in that in step (b2), fitting of all the points in the three-dimensional boundary point cloud band to form the plane is performed by adopting a least squares method.

* * * * *